United States Patent
Klingbeil

(10) Patent No.: US 9,890,695 B2
(45) Date of Patent: Feb. 13, 2018

(54) EXHAUST GAS RECIRCULATION IN A RECIPROCATING ENGINE

(75) Inventor: Adam Edgar Klingbeil, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 682 days.

(21) Appl. No.: 13/249,843

(22) Filed: Sep. 30, 2011

(65) Prior Publication Data

US 2013/0081392 A1    Apr. 4, 2013

(51) Int. Cl.

| F02B 33/44 | (2006.01) |
|---|---|
| F02B 37/007 | (2006.01) |
| F02D 23/00 | (2006.01) |
| F02D 41/00 | (2006.01) |
| F02B 47/08 | (2006.01) |
| F02M 43/00 | (2006.01) |
| F02B 37/00 | (2006.01) |
| F02B 37/04 | (2006.01) |
| F02M 26/43 | (2016.01) |
| F02M 26/08 | (2016.01) |
| F02M 26/23 | (2016.01) |
| F02M 26/01 | (2016.01) |

(52) U.S. Cl.
CPC ......... *F02B 37/007* (2013.01); *F02B 37/001* (2013.01); *F02B 37/04* (2013.01); *F02B 47/08* (2013.01); *F02D 23/00* (2013.01); *F02D 41/005* (2013.01); *F02D 41/0007* (2013.01); *F02M 26/01* (2016.02); *F02M 26/08* (2016.02); *F02M 26/23* (2016.02); *F02M 26/43* (2016.02); *F02M 43/00* (2013.01); *F02D 2400/04* (2013.01); *F02D 2400/11* (2013.01); *Y02T 10/144* (2013.01); *Y02T 10/47* (2013.01)

(58) Field of Classification Search
CPC .......... F02M 25/0711; F02M 25/0749; F02M 25/0752; F02M 43/00; F02M 25/0727; F02M 26/01; F02M 26/08; F02M 26/23; F02M 26/43; F02B 37/04; F02B 47/08; F02B 37/001; F02B 37/007; F02D 23/00; F02D 41/0007; F02D 41/005; F02D 2400/04; F02D 2400/11; Y02T 10/144; Y02T 10/47
USPC ........................ 60/605.2; 123/568.11, 568.12
See application file for complete search history.

(56) References Cited

U.S. PATENT DOCUMENTS

| 5,517,976 A | * | 5/1996 | Bachle | ........... | F01N 3/021 |
|---|---|---|---|---|---|
| | | | | | 123/568.11 |
| 6,145,313 A | * | 11/2000 | Arnold | ........... | F02B 37/00 |
| | | | | | 60/605.2 |
| 6,164,071 A | | 12/2000 | Shao et al. | | |

(Continued)

*Primary Examiner* — Jason Shanske
*Assistant Examiner* — Matthew T Largi
(74) *Attorney, Agent, or Firm* — Nitin N. Joshi

(57) ABSTRACT

A method of operating a reciprocating engine comprises recirculating exhaust gas from a first cylinder of the engine to an intake stream or air-fuel mixture of a second cylinder of the engine such that a boost pressure of the first cylinder is greater than a boost pressure of the second cylinder. An engine retrofit system and two-cycle engine employing aspects of the method are also disclosed. The present invention has been described in terms of specific embodiment(s), and it is recognized that equivalents, alternatives, and modifications, aside from those expressly stated, are possible and within the scope of the appending claims.

18 Claims, 3 Drawing Sheets

(56) References Cited

U.S. PATENT DOCUMENTS

| | | | |
|---|---|---|---|
| 6,216,461 B1 | 4/2001 | Shao et al. | |
| 6,543,230 B1* | 4/2003 | Schmid | F02D 41/0065 |
| | | | 123/568.11 |
| 6,755,022 B2 | 6/2004 | Kim et al. | |
| 6,892,682 B2 | 5/2005 | Ludu et al. | |
| 6,901,892 B2 | 6/2005 | Mavinahally et al. | |
| 7,490,466 B2 | 2/2009 | Robel et al. | |
| 7,942,117 B2 | 5/2011 | Robinson | |
| 8,671,920 B2* | 3/2014 | Hayman et al. | 123/568.11 |
| 2003/0015185 A1* | 1/2003 | Dutart | 123/585 |
| 2006/0112940 A1* | 6/2006 | Roberts, Jr. | F02D 25/00 |
| | | | 123/568.11 |
| 2007/0193270 A1* | 8/2007 | Roozenboom | F02B 29/0412 |
| | | | 60/612 |
| 2008/0000228 A1* | 1/2008 | Kieser | 60/605.1 |
| 2008/0022666 A1* | 1/2008 | Driscoll | F01N 3/035 |
| | | | 60/286 |
| 2008/0148729 A1* | 6/2008 | Endo | 60/605.2 |
| 2008/0283028 A1* | 11/2008 | Endo | 123/568.14 |
| 2011/0100339 A1 | 5/2011 | Weyer et al. | |
| 2012/0000448 A1* | 1/2012 | Freund et al. | 123/568.21 |
| 2012/0124992 A1* | 5/2012 | Fiveland | F01N 5/02 |
| | | | 60/599 |

\* cited by examiner

EXHAUST GAS RECIRCULATION IN A RECIPROCATING ENGINE

BACKGROUND OF THE INVENTION

The present invention relates generally to improving emissions on a reciprocating engine and more particularly to an exhaust gas recirculation system for use with a reciprocating engine.

Exhaust gas recirculation (EGR) is a powerful tool for reducing $NO_x$ emissions substantially in combustion devices (e.g., reciprocating engines) by reducing flame temperature. There are various approaches for employing EGR on a 4-stroke engine.

One such approach is to route exhaust gas from the low-pressure side of a turbine through an EGR cooler to the inlet of an engine compressor. Unfortunately, this approach requires all of the exhaust to be both expanded and recompressed every time the gas is expanded and compressed, thereby resulting in efficiency losses. Furthermore, the EGR is routed through the intercoolers/aftercoolers, which are designed to cool clean air as opposed to the particulate-laden air that they are required to cool in this scenario. As a result, the particulates will foul the coolers, causing loss in their effectiveness.

Another EGR approach is to pump exhaust gas from the exhaust plenum into the intake manifold, downstream of the fresh air intercoolers. While fouling of the intercoolers is mitigated, this approach requires an additional pump to pump all of the EGR.

Another approach is to retain internal EGR in all cylinders of the engine. While this is a relatively simple approach, this method suffers from a shortcoming in that the EGR is not cooled and, thereby, less effective.

Accordingly, there is an ongoing need for improving emissions on reciprocating engines.

BRIEF DESCRIPTION

The present invention overcomes at least some of the aforementioned drawbacks by providing a method of operating a reciprocating engine and an engine retrofit system that employs a novel exhaust gas recirculation methodology. Therefore, in accordance with one aspect of the invention, a method of operating a reciprocating engine comprises recirculating exhaust gas from a first cylinder of the engine to an intake stream or air-fuel mixture of a second cylinder of the engine, wherein a boost pressure of the first cylinder is greater than a boost pressure of the second cylinder.

In accordance with another aspect of the invention, an engine retrofit system comprises: a first compressor adapted to compress intake air to a first cylinder of the engine to a first pressure; a second compressor adapted to compress intake air to a second cylinder of the engine to a second pressure, wherein the first pressure is greater than the second pressure; a recirculating system comprising: a flow line configured to recirculate the exhaust gas of the first cylinder with the compressed intake air of the second cylinder; and a cooling device attached to the flow line configured to cool the recirculating exhaust gas; and a turbine adapted to receive exhaust gas from the second cylinder, wherein the turbine is mechanically linked to rotate the first compressor and the second compressor.

In accordance with another aspect of the invention, a reciprocating engine comprises a first cylinder and a second cylinder, wherein the first cylinder and the second cylinder operate on a two-stroke cycle of operation; a first compressor and a second compressor, wherein the first compressor compresses an intake steam or air-fuel mixture of the first cylinder to a first boost pressure and the second compressor compresses an intake steam or air-fuel mixture of the second cylinder to a second boost pressure, wherein the first boost pressure is greater than the second boost pressure; and an exhaust gas recirculation line configured to connect exhaust gas from the first cylinder to an intake steam or air-fuel mixture of the second cylinder.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Aspects of the present invention have been shown to offer advantages over previous methodologies of exhaust gas recirculation (EGR) for reciprocating engines. The method and retrofit system provide for an approach that allows two-stroke multi-cylinder engines to operate with both donor and non-donor cylinders. Ultimately, the $NO_x$ emissions and/or efficiency of the reciprocating engine are improved.

Figure 1:
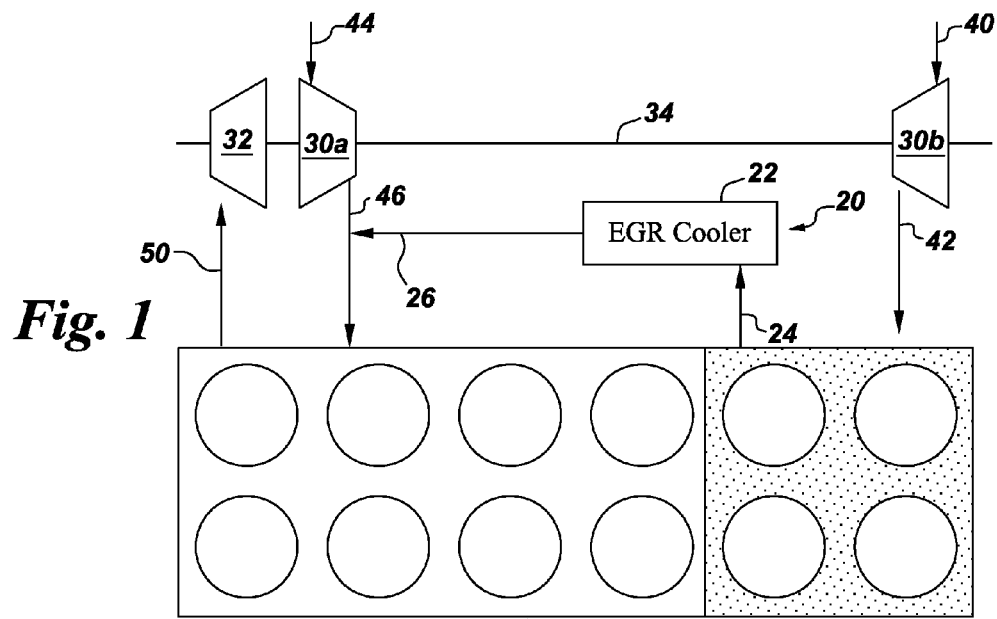
FIG. 1 is a schematic diagram of an embodiment of a reciprocating engine incorporating aspects of the present invention.

Referring to FIG. 1, a schematic diagram of an embodiment of an engine employing aspects of the present invention is shown. The engine 10 may comprise an engine having a two-stroke operating configuration. The engine 10 comprises a plurality of cylinders 12, of which are at least one donor cylinder 14 and at least one non-donor cylinder 16. For illustration purposes only, FIG. 1 shows the engine 10 having a quantity of four donor cylinder 14 and eight non-donor cylinders 16. It should be apparent that virtually any other combination of quantities of donor and non-donor cylinders may be employed without departing from aspects of the present invention.

The engine 10 comprises two compressors 30a, 30b, and one turbine 32. The compressors 30a, 30b and the turbine 32 all operate on a single shaft 34, such that the rotational energy of the turbine 32 is used to drive both compressors 30a, 30b. The first compressor 30b receives air 40 and supplies compressed air 42 at a first pressure to the donor cylinders 14. The second compressor 30a receives air 44 and supplies compressed air 46 at a second pressure to the non-donor cylinders 16, wherein the second pressure is less, lower, or at a lower absolute value, than the first pressure. That is the first compressor 30b operates at a higher boost pressure than the second compressor 30a.

The exhaust 24 from the donor cylinders 14 is routed through a cooling means 20 to mix via line 26 with compressed air 46 being supplied from the second compressor 30a and back to the non-donor cylinders 16. The exhaust 50 from the non-donor cylinders 16 is routed to drive the turbine 32. For start-up and low-load operating conditions, the engine 10 may use additional means to drive the compressors 30a, 30b such as, for example, an electric motor or other mechanism which transmits power from the crankshaft 34 to the compressors 30a, 30b at a low speed.

In this embodiment, no external EGR is supplied to the donor cylinders 14. Internal EGR is used to assist in controlling $NO_x$ emissions from the donor cylinders 14. The internal EGR is retained in the two-stroke engine 10 by proper timing of the exhaust valve (not shown) closure event in the donor cylinders 14.

The cooling means 20 employed may comprise an EGR cooler 22. Alternatively, the cooling means 20 may comprise a thermo-electric generator, an organic Rankine cycle-based generator or some other suitable waste-heat recovery device for generating power. Alternatively, the cooling means 20 may comprise a refrigeration unit, a means for injecting water or other phase-changing medium for the purpose of cooling.

Figure 2:
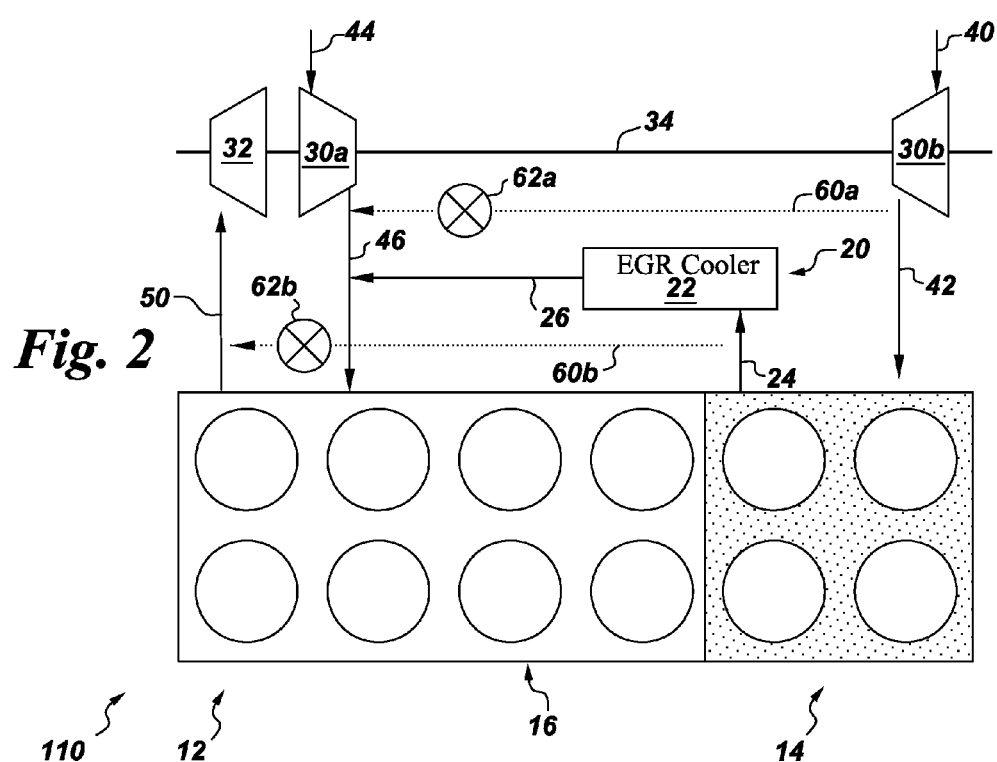
FIG. 2 is a schematic diagram of another embodiment of a reciprocating engine incorporating aspects of the present invention.

Referring to FIG. 2, a schematic diagram of another embodiment of an engine employing aspects of the present invention is shown. The engine 110 may comprise an engine having a two-stroke operating configuration. The engine 110 comprises a plurality of cylinders 12, of which are at least one donor cylinder 14 and at least one non-donor cylinder 16. For illustration purposes only, FIG. 2 shows the engine 110 having a quantity of four donor cylinder 14 and eight non-donor cylinders 16. It should be apparent that virtually any other combination of quantities of donor and non-donor cylinders may be employed without departing from aspects of the present invention.

The engine 110 comprises two compressors 30a, 30b, and one turbine 32. The compressors 30a, 30b and the turbine 32 all operate on a single shaft 34, such that the rotational energy of the turbine 32 is used to drive both compressors 30a, 30b. The first compressor 30b receives air 40 and supplies compressed air 42 at a first pressure to the donor cylinders 14. The second compressor 30a receives air 44 and supplies compressed air 46 at a second pressure to the non-donor cylinders 12, wherein the second pressure is less, lower, or at a lower absolute value, than the first pressure. That is the first compressor 30b operates at a higher boost pressure than the second compressor 30a.

The exhaust 24 from the donor cylinders 14 is routed through a cooling means 20 to mix via line 26 with compressed air 46 being supplied from the second compressor 30a and back to the non-donor cylinders 16. The exhaust 50 from the non-donor cylinders 16 is routed to drive the turbine 32. For start-up and low-load operating conditions, the engine 110 may use additional means to drive the compressors 30a, 30b such as, for example, an electric motor or other mechanism (e.g., mechanical driver, pneumatic drive, hydraulic drive, and the like) which transmits power from the crankshaft 34 to the compressors 30a, 30b at a low speed.

In this embodiment, additional bypass valves are provided to the intake and exhaust manifolds of the donor cylinders allowing some of the compressed air from the donor cylinders to pass directly to the intake manifold of the non-donor cylinders. This assists in reduction of EGR rate to the non-donor cylinders and assists in preventing over-boosting of the donor cylinders. A bypass valve from the exhaust manifold of the donor cylinders directly to the exhaust manifold of the non-donor cylinders will assist in reducing internal EGR in the donor cylinders and external EGR in the non-donor cylinders and while recouping some of the thermal energy of the exhaust from the donor cylinders.

As shown, for example, two bypass routes 60a, 60b are employed with bypass valves 62a, 62b. A first bypass route 60a and first bypass valve 62a provide fluid connection between the compressed air 42 from the first compressor 30b and the compressed air 46 from the second compressor 30a. A second bypass route 60b and second bypass valve 62b provide a fluid connection between the exhaust 24 from the donor cylinders 14 and the exhaust 50 from the non-donor cylinders 12.

The cooling means 20 employed may comprise an EGR cooler 22. Alternatively, the cooling means 20 may comprise a thermo-electric generator, an organic Rankine cycle-based generator or some other suitable waste-heat recovery device for generating power. Alternatively, the cooling means 20 may comprise a refrigeration unit, a means for injecting water or other phase-changing medium for the purpose of cooling.

Figure 3:
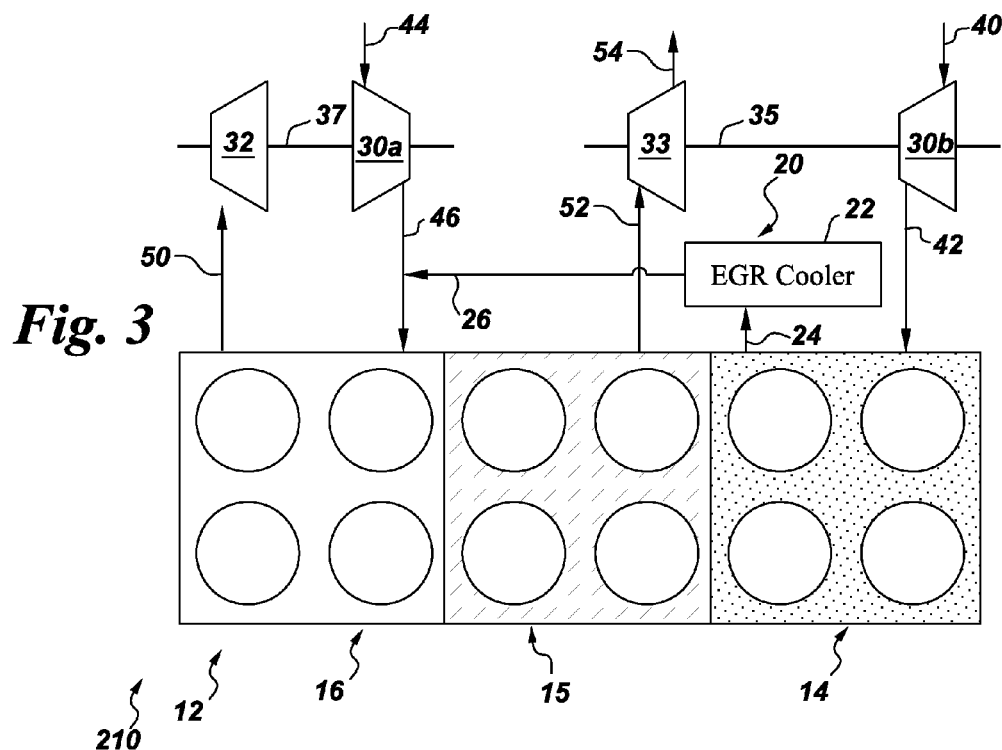
FIG. 3 is a schematic diagram of another embodiment of a reciprocating engine incorporating aspects of the present invention.

Referring to FIG. 3, a schematic diagram of another embodiment of an engine employing aspects of the present invention is shown. The engine 210 may comprise an engine having a two-stroke operating configuration. The engine 210 comprises a plurality of cylinders 12, of which comprise at least one donor cylinder 14 and a plurality of non-donor cylinders 15, 16. The plurality of non-donor cylinders comprises a first set 15 of non-donor cylinders and a second set 16 of non-donor cylinders. For illustration purposes only, FIG. 3 shows the engine 10 having a quantity of four donor cylinders 14 and eight non-donor cylinders 15, 16. It should be apparent that virtually any other combination of quantities of donor and non-donor cylinders may be employed without departing from aspects of the present invention.

The engine 210 comprises two compressors 30a, 30b, and two turbines 32, 33. The first compressor 30b and the first turbine 33 operate on a first shaft 35 and the second compressor 30a and the second turbine 32 operate on a second shaft 37. The first compressor 30b receives air 40 and supplies compressed air 42 at a first pressure to the donor cylinders 14. The second compressor 30a receives air 44 and supplies compressed air 46 at a second pressure to the non-donor cylinders 15, 16 wherein the second pressure is less, lower, or at a lower absolute value, than the first pressure. That is the first compressor 30b operates at a higher boost pressure than the second compressor 30a.

The exhaust 24 from the donor cylinders 14 is routed through a cooling means 20 to mix via line 26 with compressed air 46 being supplied from the second compressor 30a and back to the non-donor cylinders 15, 16. The exhaust from the non-donor cylinders 15, 16 is divided into two separate exhaust streams 50, 52. The exhaust 50 from the first set of non-donor cylinders 16 is routed to drive the second turbine 32. The exhaust 52 from the second set of non-donor cylinders 15 is routed to drive the first turbine 33.

For start-up and low-load operating conditions, the engine 210 may use one of the two turbochargers driven by one of the two crankshafts 35, 37 at startup and low engine power/speed.

In this embodiment, no external EGR is supplied to the donor cylinders 14. Internal EGR is used to assist in controlling $NO_x$ emissions from the donor cylinders 14. The internal EGR is retained in the two-stroke engine 10 by proper timing of the exhaust valve (not shown) closure event in the donor cylinders 14.

The cooling means 20 employed may comprise an EGR cooler 22. Alternatively, the cooling means 20 may comprise a thermo-electric generator, an organic Rankine cycle-based generator or some other suitable waste-heat recovery device for generating power. Alternatively, the cooling means 20 may comprise a refrigeration unit, a means for injecting water or other phase-changing medium for the purpose of cooling.

Figure 4:
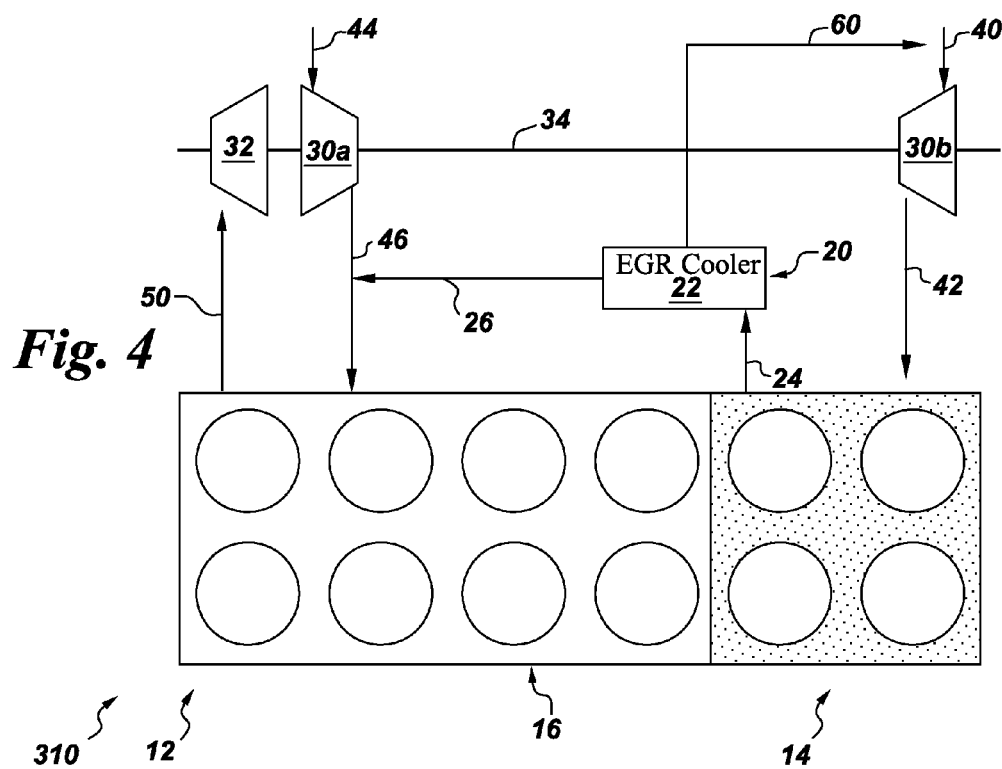
FIG. 4 is a schematic diagram of another embodiment of a reciprocating engine incorporating aspects of the present invention.

Referring to FIG. 4, a schematic diagram of an embodiment of an engine employing aspects of the present invention is shown. The engine 310 may comprise an engine having a two-stroke operating configuration. The engine 310 comprises a plurality of cylinders 12, of which are at least one donor cylinder 14 and at least one non-donor cylinder 16. For illustration purposes only, FIG. 4 shows the engine 310 having a quantity of four donor cylinders 14 and eight non-donor cylinders 16. It should be apparent that virtually any other combination of quantities of donor and non-donor cylinders may be employed without departing from aspects of the present invention.

The engine 310 comprises two compressors 30a, 30b, and one turbine 32. The compressors 30a, 30b and the turbine 32 all operate on a single shaft 34, such that the rotational energy of the turbine 32 is used to drive both compressors 30a, 30b. The first compressor 30b receives air 40 and supplies compressed air 42 at a first pressure to the donor cylinders 14. The second compressor 30a receives air 44 and supplies compressed air 46 at a second pressure to the non-donor cylinders 16, wherein the second pressure is less, lower, or at a lower absolute value, than the first pressure. That is the first compressor 30b operates at a higher boost pressure than the second compressor 30a.

The exhaust 24 from the donor cylinders 14 is routed through a cooling means 20 to mix via line 26 with compressed air 46 being supplied from the second compressor 30a and back to the non-donor cylinders 16. The exhaust 50 from the non-donor cylinders 16 is routed to drive the turbine 32. In addition, low pressure EGR is routed, via 60, to an inlet of the first compressor 30b. A flow limiting means (e.g., control valve, control orifice, and the like) (not shown) may be added to limit the amount of EGR being cycled back to the donor cylinders 14.

In this embodiment, external EGR is supplied to the donor cylinders 14. However, internal EGR may also be used to assist in controlling $NO_x$ emissions from the donor cylinders 14. The internal EGR is retained in the two-stroke engine 310 by proper timing of the exhaust valve (not shown) closure event in the donor cylinders 14 while the external EGR can be controlled via a flow limiting means.

The cooling means 20 employed may comprise an EGR cooler 22. Alternatively, the cooling means 20 may comprise a thermo-electric generator, an organic Rankine cycle-based generator or some other suitable waste-heat recovery device for generating power. Alternatively, the cooling means 20 may comprise a refrigeration unit, a means for injecting water or other phase-changing medium for the purpose of cooling.

Figure 5:
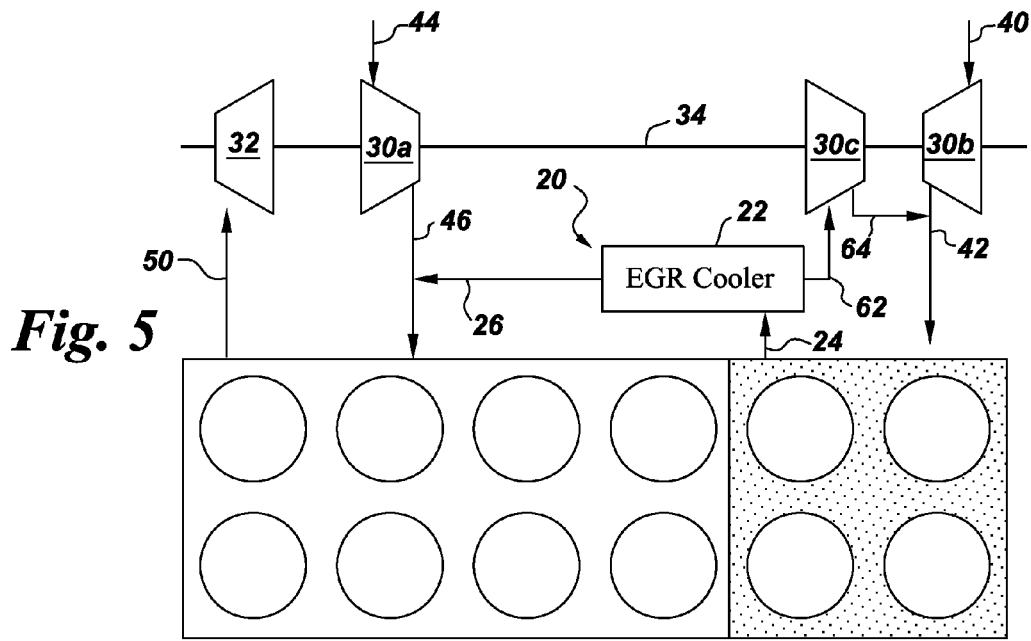
FIG. 5 is a schematic diagram of another embodiment of a reciprocating engine incorporating aspects of the present invention.

Referring to FIG. 5, a schematic diagram of another embodiment of an engine employing aspects of the present invention is shown. The engine 410 may comprise an engine having a two-stroke operating configuration. The engine 410 comprises a plurality of cylinders 12, of which comprise at least one donor cylinder 14 and at least one non-donor cylinders 16. For illustration purposes only, FIG. 5 shows the engine 410 having a quantity of four donor cylinders 14 and eight non-donor cylinders 16. It should be apparent that virtually any other combination of quantities of donor and non-donor cylinders may be employed without departing from aspects of the present invention.

This embodiment provides cooled, high pressure EGR to both the donor cylinders 14 and the non-donor cylinders 16. The engine 410 utilizes three compressors 30a, 30b, 30c and turbine 32. The first compressor 30a, the second compressor 30b, the third compressor 30c and the turbine 32 may operate on a common shaft 34. The first compressor 30b receives air 40 and supplies compressed air 42 at a first pressure to the donor cylinders 14. The second compressor 30b receives air 44 and supplies compressed air 46 at a second pressure to the non-donor cylinders 16 wherein the second pressure is less, lower, or at a lower absolute value, than the first pressure. That is the first compressor 30a operates at a higher boost pressure than the second compressor 30b.

The exhaust 24 from the donor cylinders 14 is routed through a cooling means 20 to mix via line 26 with compressed air 46 being supplied from the second compressor 30b and back to the non-donor cylinders 16. The exhaust 50 from the non-donor cylinders 16 is routed to drive the turbine 32. A portion of the cooled EGR is routed via 62 to the third compressor 30c. The pressure ratio of the third compressor 30c is less than the pressure ratio of the first compressor 30a. The compressed, EGR from the third compressor 30c is routed, via 64, back to the intake system of the donor cylinders 14.

In this embodiment, external EGR is supplied to the donor cylinders 14. However, internal EGR may also be used to assist in controlling $NO_x$ emissions from the donor cylinders 14. If internal EGR is used, it is retained in the two-stroke engine 10 by proper timing of the exhaust valve (not shown) closure event in the donor cylinders 14.

The cooling means 20 employed may comprise an EGR cooler 22. Alternatively, the cooling means 20 may comprise a thermo-electric generator, an organic Rankine cycle-based generator or some other suitable waste-heat recovery device for generating power. Alternatively, the cooling means 20 may comprise a refrigeration unit, a means for injecting water or other phase-changing medium for the purpose of cooling.

Figure 6:
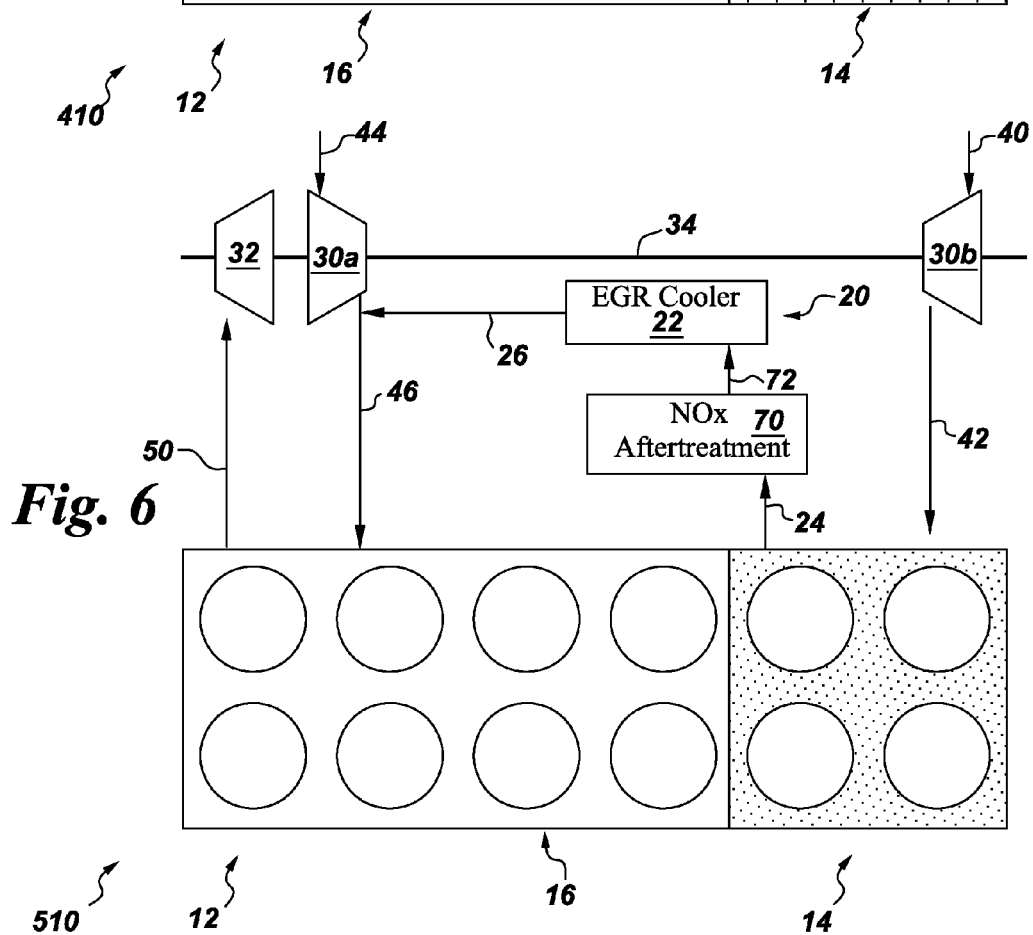
FIG. 6 is a schematic diagram of another embodiment of a reciprocating engine incorporating aspects of the present invention.

Referring to FIG. 6, a schematic diagram of an embodiment of an engine employing aspects of the present invention is shown. The engine 510 may comprise an engine having a two-stroke operating configuration. The engine 510 comprises a plurality of cylinders 12, of which are at least one donor cylinder 14 and at least one non-donor cylinder 16. For illustration purposes only, FIG. 6 shows the engine 510 having a quantity of four donor cylinder 14 and eight non-donor cylinders 16. It should be apparent that virtually any other combination of quantities of donor and non-donor cylinders may be employed without departing from aspects of the present invention.

The engine 510 utilizes two compressors 30a, 30b, and one turbine 32. The compressors 30a, 30b and the turbine 32 all operate on a single shaft 34, such that the rotational energy of the turbine 32 is used to drive both compressors 30a, 30b. The first compressor 30b receives air 40 and supplies compressed air 42 at a first pressure to the donor cylinders 14. The second compressor 30a receives air 44 and supplies compressed air 46 at a second pressure to the non-donor cylinders 16, wherein the second pressure is less, lower, or at a lower absolute value, than the first pressure.

That is the first compressor 30b operates at a higher boost pressure than the second compressor 30a.

The exhaust 24 from the donor cylinders 14 is routed to a $NO_x$ aftertreatment device 70 and then, via 72, through a cooling means 20 to mix via line 26 with compressed air 46 being supplied from the second compressor 30a and back to the non-donor cylinders 16. The exhaust 50 from the non-donor cylinders 16 is routed to drive the turbine 32. For start-up and low-load operating conditions, the engine 10 may use additional means to drive the compressors 30a, 30b such as, for example, an electric motor or other mechanism which transmits power from the crankshaft 34 to the compressors 30a, 30b at a low speed.

In this embodiment, no external EGR is supplied to the donor cylinders 14. Internal EGR may be used to assist in controlling $NO_x$ emissions from the donor cylinders 14. The internal EGR is retained in the two-stroke engine 510 by proper timing of the exhaust valve (not shown) closure event in the donor cylinders 14.

The cooling means 20 employed may comprise an EGR cooler 22. Alternatively, the cooling means 20 may comprise a thermo-electric generator, an organic Rankine cycle-based generator or some other suitable waste-heat recovery device for generating power. Alternatively, the cooling means 20 may comprise a refrigeration unit, a means for injecting water or other phase-changing medium for the purpose of cooling. The $NO_x$ aftertreatment device 70 may comprise an SCR system and the like.

Aspects of the present invention offer another advantage in the ability to add various devices (e.g., piping, turbochargers, etc.) in a retrofit kit assembly to a pre-existing two-stroke reciprocating engine. In this manner, the pre-existing engine can receive the added emissions benefits offered by aspects of the present invention. Clearly, newly manufactured engines may employ aspects of the present invention, as well.

While the embodiments illustrated and described herein may be used with a two-stroke configured reciprocating engine, aspects of the present invention may employ other configurations of engines. For example, the method may be employed with reciprocating engines with a four-stroke configuration, sterling engines, and the like.

Therefore, according to one embodiment of the present invention, a method of operating a reciprocating engine comprises recirculating exhaust gas from a first cylinder of the engine to an intake stream or air-fuel mixture of a second cylinder of the engine, wherein a boost pressure of the first cylinder is greater than a boost pressure of the second cylinder.

According to another embodiment of the present invention, an engine retrofit system comprises: a first compressor adapted to compress intake air to a first cylinder of the engine to a first pressure; a second compressor adapted to compress intake air to a second cylinder of the engine to a second pressure, wherein the first pressure is greater than the second pressure; a recirculating system comprising: a flow line configured to recirculate the exhaust gas of the first cylinder with the compressed intake air of the second cylinder; and a cooling device attached to the flow line configured to cool the recirculating exhaust gas; and a turbine adapted to receive exhaust gas from the second cylinder, wherein the turbine is mechanically linked to rotate the first compressor and the second compressor.

Another aspect of the invention, a reciprocating engine comprises a first cylinder and a second cylinder, wherein the first cylinder and the second cylinder operate on a two-stroke cycle of operation; a first compressor and a second compressor, wherein the first compressor compresses an intake steam or air-fuel mixture of the first cylinder to a first boost pressure and the second compressor compresses an intake steam or air-fuel mixture of the second cylinder to a second boost pressure, wherein the first boost pressure is greater than the second boost pressure; and an exhaust gas recirculation line configured to connect exhaust gas from the first cylinder to an intake steam or air-fuel mixture of the second cylinder.

The present invention has been described in terms of the preferred embodiment, and it is recognized that equivalents, alternatives, and modifications, aside from those expressly stated, are possible and within the scope of the appending claims.

What is claimed is:

1. A method of operating a two-stroke reciprocating engine comprising:
   recirculating exhaust gas via a line from a donor cylinder of the two-stroke engine to an intake stream or air-fuel mixture of a non-donor cylinder of the two-stroke engine, wherein a boost pressure of the intake stream or air-fuel mixture in an intake manifold to the donor cylinder is greater than a boost pressure of the intake stream or air-fuel mixture in an intake manifold to the non-donor cylinder, wherein the donor cylinder is different than the non-donor cylinder;
   cooling the recirculating exhaust gas;
   compressing air to the donor cylinder at a first pressure with a first compressor; and
   compressing air to the non-donor cylinder at a second pressure different than the first pressure with a second compressor;
   wherein the cooled recirculating exhaust gas is mixed with the air having the second pressure and the resultant mixture is fed to the non-donor cylinder;
   wherein the air having the first pressure is fed directly to the donor cylinder.

2. The method of claim 1 wherein the reciprocating engine operates on diesel fuel.

3. The method of claim 1, wherein the reciprocating engine operates on gasoline fuel.

4. The method of claim 1, wherein the reciprocating engine operates on one of natural gas fuel, syngas, landfill gas, and $CO/H_2$ mixture.

5. The method of claim 1 wherein the reciprocating engine operates on a plurality of fuels.

6. The method of claim 1, further comprising operating the first compressor and the second compressor with a single turbine.

7. The method of claim 1, further comprising operating the first compressor and the second compressor with at least one of a turbine, electric motor, and a gear-driven means coupled to a crankshaft of the engine.

8. The method of claim 1, wherein the cooling is provided by an exhaust gas recirculation cooler.

9. The method of claim 1, further comprising providing at least one of: a bypass line from a first intake of the donor cylinder to a second intake of the non-donor cylinder; and, another bypass line from a first exhaust of the donor cylinder to a second exhaust of the non-donor cylinder.

10. The method of claim 9, wherein at least one of the bypass line and the another bypass line further comprises a valve.

11. The method of claim 1, further comprising: directing exhaust gas from a third cylinder to a first turbocharger; and directing exhaust gas from the non-donor cylinder to a second turbocharger; wherein the first turbocharger is different than the second turbocharger, and further wherein the first turbocharger drives the first compressor and the second turbocharger drives the second compressor.

12. The method of claim 1, further comprising diverting a portion of the cooled recirculated exhaust gas to an intake of a compressor for the donor cylinder.

13. The method of claim 1, further comprising diverting a portion of the cooled recirculated exhaust gas to a compressor of the donor cylinder.

14. The method of claim 1, further comprising directing the recirculating exhaust gas through a NOx aftertreatment device.

15. The method of claim 14, wherein the $NO_x$ aftertreatment device is upstream of the cooling of the recirculating exhaust gas.

16. The method of claim 15, wherein the $NO_x$ aftertreatment device comprises an SCR system.

17. An engine retrofit system for a two-stroke engine comprising:
   a first compressor to compress intake air to a donor cylinder of the two-stroke engine to a first pressure;
   a second compressor to compress intake air to a non-donor cylinder of the two-stroke engine to a second pressure, wherein the first pressure is greater than the second pressure;
   a recirculating system comprising:
      a flow line to recirculate the exhaust gas of the donor cylinder with the compressed intake air of the non-donor cylinder; and
      a cooling device attached to the flow line to cool the recirculating exhaust gas; and
   a turbine to receive exhaust gas from the non-donor cylinder, wherein the turbine is mechanically linked to rotate the first compressor and the second compressor;
   wherein the cooled recirculating exhaust gas is mixed with the air having the second pressure and the resultant mixture is fed to the non-donor cylinder;
   wherein the air having the first pressure is fed directly to the donor cylinder.

18. A reciprocating engine comprising:
   a donor cylinder and a non-donor cylinder, wherein the donor cylinder and the non-donor cylinder operate on a two-stroke cycle of operation;
   a first compressor and a second compressor, wherein the first compressor compresses an air-fuel mixture of the donor cylinder to a first boost pressure and the second compressor compresses an air-fuel mixture of the non-donor cylinder to a second boost pressure, wherein the first boost pressure is greater than the second boost pressure; and
   an exhaust gas recirculation line to connect exhaust gas from the donor cylinder to an intake steam or air-fuel mixture of the non-donor cylinder;
   wherein cooled exhaust gas is mixed with the air-fuel mixture having the second boost pressure and the resultant mixture is fed to the non-donor cylinder,
   wherein the air-fuel mixture having the first boost pressure is fed directly to the donor cylinder.

* * * * *